United States Patent
Xu et al.

(10) Patent No.: US 11,999,901 B2
(45) Date of Patent: Jun. 4, 2024

(54) MULTIFUNCTIONAL WAX DISPERSANT FOR SUBTERRANEAN CHEMICAL APPLICATIONS

(71) Applicant: Evonik Operations GmbH, Essen (DE)

(72) Inventors: Liang Xu, The Woodlands, TX (US); Sofia Sirak, Plymouth Meeting, PA (US); Iryna Zhuk, Warrington, PA (US); Claudia Meister, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/307,714

(22) Filed: Apr. 26, 2023

(65) Prior Publication Data

US 2023/0416596 A1    Dec. 28, 2023

(30) Foreign Application Priority Data

Apr. 28, 2022 (EP) .................................. 22170499

(51) Int. Cl.
    *C09K 8/584*        (2006.01)
    *E21B 43/26*        (2006.01)

(52) U.S. Cl.
     CPC .................................. *C09K 8/584* (2013.01)

(58) Field of Classification Search
     None
     See application file for complete search history.

(56) References Cited

U.S. PATENT DOCUMENTS

| | | | |
|---|---|---|---|
| 7,556,654 B1 | 7/2009 | Nero | |
| 7,985,722 B2 | 7/2011 | DeSanto | |
| 8,372,786 B2 | 2/2013 | Berkland et al. | |
| 9,243,212 B2 | 1/2016 | Kuppert et al. | |
| 2004/0171512 A1 | 9/2004 | Furuta et al. | |
| 2011/0256085 A1* | 10/2011 | Talingting Pabalan | A61K 8/86 424/70.16 |
| 2014/0296168 A1 | 10/2014 | Schilling et al. | |
| 2017/0298710 A1 | 10/2017 | Xu et al. | |
| 2018/0023040 A1 | 1/2018 | Schilling et al. | |
| 2018/0312745 A1 | 11/2018 | Do et al. | |
| 2020/0071600 A1 | 3/2020 | Farmer et al. | |
| 2021/0301191 A1 | 9/2021 | Farmer et al. | |

FOREIGN PATENT DOCUMENTS

| | | |
|---|---|---|
| CN | 1337439 | 2/2002 |
| CN | 104650824 | 5/2015 |
| CN | 109628076 | 4/2019 |
| DE | 29 39 519 | 4/1980 |
| DE | 41 27 908 | 2/1993 |
| DE | 196 00 743 | 7/1997 |
| DE | 196 48 439 | 5/1998 |
| EP | 0 282 942 | 9/1988 |
| EP | 0 499 434 | 8/1992 |
| EP | 1 445 302 | 8/2004 |
| EP | 1 411 111 | 9/2008 |
| EP | 2 786 743 | 10/2014 |
| EP | 2 787 065 | 10/2014 |
| FR | 2 740 779 | 5/1997 |
| FR | 2 855 752 | 12/2004 |
| JP | S60-183032 | 9/1985 |
| JP | 2001-304034 | 10/2001 |
| JP | 2006-70231 | 3/2006 |
| JP | 2006-83238 | 3/2006 |
| JP | 2006-274233 | 10/2006 |
| JP | 2007-181789 | 7/2007 |
| JP | 2008-62179 | 3/2008 |
| KR | 10-2004-0033376 | 4/2004 |
| RU | 2685385 | 4/2019 |
| WO | 03/002700 | 1/2003 |
| WO | 03/006146 | 1/2003 |
| WO | 2014/167375 | 10/2014 |
| WO | 2019/154970 | 8/2019 |
| WO | 2020/088858 | 5/2020 |
| WO | 2020/264073 | 12/2020 |

OTHER PUBLICATIONS

JP 2005097616 (Year: 2005).*
WO 201701377869 (Year: 2017).*
Extended European Search Report issued Oct. 27, 2022, in European Patent Application No. 22170499.2, 6 pages.
Gao et al., "Interface-Induced Disassembly of a Self-Assembled Two-Component Nanoparticle System", Langmuir, vol. 29, 2013, pp. 3654-3661.
Lei et al., "Enhanced rhamnolipids production in Pseudomonas aeruginosa SG by selectively blocking metabolic bypasses of glycosyl and fatty acid precursors", Biotechnol. Lett., vol. 42, 2020, pp. 997-1002.
Xu et al., U.S. Appl. No. 18/308,169, filed Apr. 27, 2023.
U.S. Appl. No. 18/308,169, filed Apr. 27, 2023, Xu et al.

* cited by examiner

*Primary Examiner* — Charles R Nold
(74) *Attorney, Agent, or Firm* — Grüneberg and Myers PLLC

(57) ABSTRACT

A composition for use as a multifunctional wax dispersant can treat subterranean formations for the recovery of oil and gas from oil and gas wells. A process can be used for the preparation thereof. A method for treating a crude oil with a wax dispersant composition according to the present invention reduces interfacial tension between the crude oil and the treatment fluids in the recovery of oil and gas from crude oil and gas wells.

20 Claims, No Drawings

MULTIFUNCTIONAL WAX DISPERSANT FOR SUBTERRANEAN CHEMICAL APPLICATIONS

CROSS-REFERENCE TO RELATED APPLICATIONS

This application claims priority to European Application No. 22170499.2, filed on Apr. 28, 2022, the content of which is hereby incorporated by reference in its entirety.

BACKGROUND OF THE INVENTION

Technical Field of the Invention

The invention relates to a composition for use as a multifunctional wax dispersant to treat subterranean formations for the recovery of oil and gas from oil and gas wells, as well as to the process of preparation thereof. The invention also relates to a method for treating a crude oil with a wax dispersant composition according to the present invention to reduce interfacial tension between the crude oil and the treatment fluids in the recovery of oil and gas from crude oil and gas wells.

Description of Related Art

The present invention relates to chemical compositions for treating subterranean formations for the recovery of oil and gas from oil and gas wells. In recent years, there has been a growing interest in the use of chemicals in oilfield chemical applications to drill and extract oil and gas more efficiently. For example, during well stimulation such as hydraulic fracturing (frac), a conventional non-emulsifying surfactant is typically used to eliminate strong emulsions that do not break easily, being formed during multiphase oil, gas and water flow, from reservoir to wellhead. These tight emulsions could create unwanted blockage along the pathways of oil and gas flow, potentially limiting oil and gas recovery.

Generally speaking, the addition of surfactant can reduce the interfacial tension between oil and water, inhibit emulsification by reducing the solubility of oil and water. It also reduces oil adsorption on the rock and decrease the viscosity of crude oil by dispersing waxy compounds in the crude oil into the aqueous phase. Additionally, surfactants can help increase oil mobility through the reservoir, thus allowing better displacement of the oil by injected water or gas.

Linear and branched alkyl benzene sulfonates are one of the most commonly used surfactants in EOR (Enhanced Oil Recovery) applications. This family of chemicals is classified as anionic surfactants. However, conventionally formulated non-emulsifying surfactants based on sulfonates do not reduce or mitigate potential wax deposition inside newly created fractures during stimulation. Indeed, conventional non-emulsifying surfactants do not usually disperse and reduce efficiently wax deposit in the interior of the reservoir, because of lack of wax active components in its chemical compositions. Therefore, oil and gas recovery producers usually choose to incorporate multifunctional wax dispersant to increase the non-emulsifying effect during oil and gas recovery.

For example, US20170298710 relates to a method for treating subterranean formations with a treatment fluid comprising an aqueous base fluid and one multifunctional surfactant complex comprising at least one sulfonate-based surfactant and at least one polymeric additive, wherein the surfactant and the polymeric additive carry opposite charges; and introducing the treatment fluid into a well bore at a well site penetrating at least a portion of a subterranean formation. It is disclosed that the polymeric additive should carries a charge opposite to the surfactant, thus be cationic.

CN104850824A relates to an oil-gas bed well drilling anti-water blocking composition, which is an aqueous solution containing a surface-active ingredient, wherein the surface-active ingredient is jointly composed of a fluorocarbon surfactant and a biological surfactant. It is described that the biosurfactant is at least one of a lipopeptide, soybean lecithin, sophorolipid, and rhamnolipid.

US20200071800 discloses compositions and methods of microbial enhanced oi recovery using biochemical-producing microbes. In particular, low molecular weight glycolipids such as sophorolipids are discussed.

U.S. Pat. No. 8,372,788 discloses mixing a nanoparticle of polyanions and polycations with typical oilfield chemicals. In a follow-up publication (Yan Gao, Le T. Duc, Affira Ali, Beverly Liang, Jenn-Tai Liang, and Prajnaparamita Dhar Langmuir 2013 29 (11), 3854-3881 DOI: 10.1021/la400082b), it is described that sodium lauryl sulfate and polyethyleneimine were combined to form a nanoparticle for use in oil recovery additives.

The additives for oilfield applications reported in the above-indicated literatures respectively use different surface-active ingredients, but the compositions from polycations are generally complicated, inconvenient to use, and cost prohibitive. Therefore, it would be beneficial to develop a multifunctional wax dispersant composition which would be cost efficient but would also boost oil recovery by lowering interfacial tension, increasing oi mobility, thus allowing better displacement of the oil by injected treatment fluids.

BRIEF SUMMARY OF THE INVENTION

After thorough investigation, the inventors of the present invention have found that the wax dispersant composition as defined below solves the above technical problem. Advantageously, as shown in the experimental part of the present invention, the wax dispersant composition according to the present invention can lower oil and water interfacial tension, increase oil mobility, thus allowing better displacement of the oil by injected water. Indeed, improving oil and water interfacial tension allows oil to pass more effectively through porous rocks.

Therefore, in a first aspect, the present invention relates to a wax dispersant composition as defined below, and its described embodiments.

A second aspect of the invention is a method for preparing such compositions.

A third aspect of the invention is a method for increasing the recovery of oil and gas from oil and gas wells by using the wax dispersant composition according to the present invention.

The invention also includes the following embodiments:

1. A wax dispersant composition for use in subterranean applications comprising a carrier medium and the following compounds:
   A) a nonionic alcohol ethoxylate,
   B) an alkylbenzene sulfonate,
   C) a bifunctional quaternary ammonium chloride salt of Formula (IV)

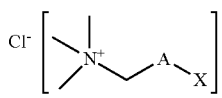

Formula (IV)

wherein A is a branched or unbranched $C_1$ to $C_4$ alkyl residue

X is OY or NHY, wherein Y is H, $C_1$-$C_3$ alkyl residue, $C(=O)C(CH_3)=CH_2$, $C(=O)CH=CH_2$, $C(=O)CH(CH_3)CH_3$, or $C(=O)CH_2CH_3$, wherein the weight ratio of the total amount of compounds A) and B) to the amount of compound C) is from 7:1 to 25:1.

2. The composition according to embodiment 1, wherein the weight ratio of compounds A) and B) to compound C) In the wax dispersant composition is from 7:1 to 20:1.

3. The composition according to embodiment 1 or 2, wherein the nonionic alcohol ethoxylate A) is an alcohol ethoxylate with the Formula $R(OC_2H_4)_nOH$, wherein R is a branched or linear aliphatic hydrocarbyl radical containing from 6 to 16 carbon atoms, preferably 8 to 14 carbon atoms, and wherein n ranges from 2 to 14, preferably from 2 to 12.

4. The composition according to embodiment 3, wherein the alcohol ethoxylate A) has an average of 1 to 10 ethylene oxide groups with an HLB value of from 5 to 15.

5. The composition according to any one or the previous embodiments, wherein the alkylbenzene sulfonate compound B) is triethanolamine salt of dodecylbenzene sulfonic acid.

6. The composition according to any one of the previous embodiments, wherein in Formula (IV) of compound C), A is an unbranched $C_1$ to $C_4$ alkyl residue, more preferably an unbranched $C_1$ to $C_2$ alkyl residue.

7. The composition according to any one of the previous embodiments, wherein in Formula (IV) of compound C), X is chosen within the group consisting of OY with Y being hydrogen or $C(=O)C(CH_3)=CH_2$, or NHY with Y being $C(=O)C(CH_3)=CH_2$.

8. The composition according to any one of the previous embodiments, wherein the bifunctional quaternary ammonium chloride salt C) of Formula (IV) is 3-trimethylammoniumpropyl methacrylamide chloride, trimethylaminoethyl methacrylate chloride, or a mixture thereof 9. The composition according to any one of the previous embodiments, wherein the total amount of compounds A), B) and C) is from 10 to 100% by weight, preferably from 30 to 100% by weight, even more preferably from 50 to 100% by weight, based on the total weight or all compounds in the wax dispersant composition, not including the carrier medium.

10. The composition according to any one of the previous embodiments, wherein the composition further comprises a biosurfactant D), which is selected from the group consisting of rhamnolipids, sophorolipids, glucolipids or a mixture thereof.

11. The composition according to embodiment 10, wherein the biosurfactant D) is a sophorolipid, in which the ratio by weight of lactone form to acid form is in the range of 20:80 to 80:20, preferably in the range of 30:70 to 40:60.

12. The wax dispersant composition according to any one of the previous embodiments, wherein the total content of carrier medium in the composition is from 10 to 90% by weight, preferably 20 to 90% by weight, even more preferably 30 to 90% by weight, based on the total weight of the wax dispersant composition.

13. The wax dispersant composition according to any one of the previous embodiments, wherein the amount of the carrier medium, compounds A), B) and C) in the wax dispersant composition, sums up to at least 90% by weight, based on the total weight of the wax dispersant composition.

14. Method for preparing a wax dispersant composition as defined in any one of embodiments 1 to 13, comprising mixing a carrier medium and the compounds as defined in any one of embodiments 1 to 13 to provide a wax dispersant composition.

15. Method for treating a crude oil with a wax dispersant composition according to any one of embodiments 1 to 13 to reduce interfacial tension between the crude oil and a treatment fluid in the recovery of oil and gas from crude oil and gas wells.

DETAILED DESCRIPTION OF THE INVENTION

Wax Dispersant Composition According to the Invention

The present invention relates to a wax dispersant composition for use in subterranean applications comprising a carrier medium, and the following compounds:
A) a nonionic alcohol ethoxylate or a mixture thereof.
B) an alkylbenzene sulfonate, or a mixture thereof,
C) a bifunctional quaternary ammonium chloride salt of Formula (IV)

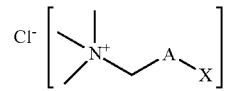

Formula (IV)

wherein A is a branched or unbranched $C_1$ to $C_4$ alkyl residue

X is OY or NHY, wherein Y is H, $C_1$-$C_3$ alkyl residue, $C(=O)C(CH_3)=CH_2$, $C(=O)CH=CH_2$, $C(=O)CH(CH_3)CH_3$, or $C(=O)CH_2CH_3$, wherein the weight ratio of the total amount of compounds A) and B) to the amount of compound C) is from 7:1 to 25:1.

It has been surprisingly observed that the salts C) of Formula (IV) drastically enhances the performance of a mixture comprising a surfactant A) and an alkylbenzene sulfonate B) to boost oil recovery. By combining them, according to a certain weight ratio as defined in the description, the inventors have observed a synergistic effect between A), B) and C), in which they believe that the bifunctional quaternary ammonium chloride salt C) of Formula (IV) forms a complex with the nonionic alcohol ethoxylate A) and the alkylbenzene sulfonate C). This complex then behaves like a chemical cargo carrier, releasing its "cargo" chemical at a later time when encountering hydrocarbon compounds in downhole conditions during the oil recovery extraction process, as can be seen in the experimental part with longer emulsion times for the inventive wax dispersant compositions of the invention.

Preferably, the weight ratio of compounds A) and B) to compound C) in the wax dispersant composition is from 7:1 to 20:1.

The term "wax dispersant composition" in the context of the present invention refers to a mixture of surfactant based chemical agents that disperse and suspend visually or light microscopically identifiable wax aggregates that are not precipitating, but instead remain dispersed or suspended in bulk fluids. Indeed, to keep oil flowing and not depositing in downhole or flowlines, it is essential to avoid solid or gel sediments which are unsuitable for further processing on a large industrial scale, because crude oils with wax aggregates are difficult to pump without large pumping pressure drops.

The present invention discloses an additive composition (to be added to the treatment fluid as indicated in the section below "Use of the wax dispersant composition according to the invention") that comprises water-soluble wax active nonionic alcohol ethoxylate surfactant A), an alkylbenzene sulfonate B) and a bifunctional ammonium quaternary salt compound C) of Formula (IV). The wax dispersant composition according to the invention is multifunctional because it imparts at least the following properties:

Disperse waxy crude oil in the aqueous phase
Reduce surfactant adsorption on the reservoir rock
Reduce surfactant precipitation in high salinity brine
Reduce clay swelling
Reduce or inhibit oil and water emulsion.

Preferably, the total amount of components A), B) and C) is at least 10% by weight, preferably is from 10 to 100% by weight, preferably from 20 to 100% by weight, even more preferably from 30 to 100% by weight, most preferably from 50 to 100% by weight based on the total weight of the wax dispersant composition, not including the carrier medium.

Preferably, the total content or the carrier medium in the composition is from 10 to 95% by weight, preferably 20 to 90% by weight, even more preferably from 30 to 90% by weight, based on the total weight of the wax dispersant composition.

Preferably, the amounts of carrier medium, compounds A), B) and C) in the wax dispersant composition sum up to at least 90% by weight, more preferably from 90 to 100% by weight, even more preferably from 95 to 100% by weight, most preferably sum up to 100% by weight, based on the total weight of the wax dispersant composition.

Carrier Medium

Within the context or the present invention, the term "carrier medium" refers to the liquid in the wax dispersant composition of the invention and is preferably selected from the group consisting of water, acid, liquified hydrocarbon, or a mixture thereof, more preferably water.

Preferably, the total content of the carrier medium in the wax dispersant composition is from 10 to 90% by weight, preferably 20 to 90% by weight, even more preferably from 30 to 90% by weight, most preferably from 50 to 90% by weight, based on the total weight of the wax dispersant composition.

Compounds A)

These alcohol ethoxylates according to the present invention can be branched or linear and contain an ethylene oxide chain attached to a branched or linear alcohol. These compounds act as surfactant when used in a wax dispersant composition.

In the context of the present invention, the term "surfactant" is understood to mean organic substances having interface-active properties that has the ability to reduce the surface tension of water. Surface tension is typically determined by tensiometers such as the DuNouy ring method.

Preferably, the alcohol ethoxylate A) is branched or linear and contain an ethylene oxide chain attached to a branched or linear alcohol of Formula $R(OC_2H_4)_nOH$, wherein R is an aliphatic hydrocarbyl radical containing from 6 to 16 carbon atoms, preferably 8 to 14 carbon atoms, and wherein n ranges from 2 to 14, preferably from 2 to 12.

Preferably, the alcohol ethoxylate A) has an average of 1 to 10 ethylene oxide groups with an HLB value of from 5 to 15.

Examples of alcohol ethoxylates are the ethoxylated alcohol product from Evonik, TOMADOL® 91-2.5, containing an average of 2.7 ethylene oxide groups with an HLB value of 8.5 (with the formula $R(OC_2H_4)_nOH$ wherein R is an aliphatic hydrocarbyl radical containing from 9 to 11 carbon atoms and with an average value of n being 2.7), or the ethoxylated alcohol product from Evonik, TOMADOL® 91-6, containing an average of 6 ethylene oxide groups with an HLB value of 12.4 (with the formula $R(OC_2H_4)_nOH$ wherein R is an aliphatic hydrocarbyl radical containing from 9 to 11 carbon atoms and with an average value of n being 6).

Compounds B)

According to the present invention, compound B) is an aklylbenzene sulfonate. The chemical groups of alkylbenzene sulfonates are anionic surfactants, consisting of a hydrophilic sulfonate head-group and a hydrophobic alkylbenzene tall-group.

A particularly preferred compound D) is Triethanolamine TEA Dodecylbenzene Sulfonate (TEA-DDBSA).

Compounds C)

The wax dispersant composition comprises a compound C) or a mixture of compounds C), which is a bifunctional quaternary ammonium chloride salt of Formula (IV)

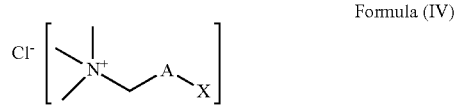

Formula (IV)

wherein A is a branched or unbranched $C_1$ to $C_4$ alkyl residue, wherein X is OY or NHY, wherein Y is H, $C_1$-$C_3$ alkyl residue, $C(=O)C(CH_3)=CH_2$, $C(=O)CH=CH_2$, $C(=O)CH(CH_3)CH_3$, or $C(=O)CH_2CH_3$.

Preferably, in Formula (IV) of compound C), A is an unbranched $C_1$ to $C_4$ alkyl residue, more preferably an unbranched $C_1$ to $C_2$ alkyl residue.

Preferably, in Formula (IV) of compound C), X is chosen within the group consisting of OY with Y being hydrogen or $C(=O)C(CH_3)=CH_2$, or NHY with Y being $C(=O)C(CH_3)=CH_2$.

Preferably, the bifunctional quaternary ammonium chloride salt C) of Formula (IV) is 3-trimethylammoniumpropyl methacrylamide chloride (MAPTAC), trimethylaminoethyl methacrylate chloride (TMAEMC), or a mixture thereof.

Additional Compounds

The wax dispersant composition according to the present invention may comprise further additives used in wax dispersant compositions to treat subterranean formations for the recovery of oil and gas from oil and gas wells used, such as compounds D) described below.

Compounds D)

Preferably, the wax dispersant composition further comprises a compound D), which is one biosurfactant selected from rhamnolipids, sophorolipids, glucolipids, cellulose lipids, mannosylerythritol lipids and trehalose lipids or a mixture thereof, preferably rhamnolipids, sophorolipids and glucolipids or a mixture thereof, most preferably sophorolipids.

Within the context of the present invention, "biosurfactants" are understood as meaning all glycolipids produced by fermentation. The term "biosurfactant" also covers glycolipids that are chemically or enzymatically modified after fermentation, as long as structurally a glycolipid remains. Raw materials for producing the biosurfactants that can be used are carbohydrates, in particular sugars such as e.g. glucose and/or lipophilic carbon sources such as fats, oils, partial glycerides, fatty acids, fatty alcohols, long-chain saturated or unsaturated hydrocarbons.

The biosurfactants can be produced e.g. as in EP 0 499 434, U.S. Pat. No. 7,985,722, WO 03/006146, JP 60 183032, DE 19648439, DE 19600743, JP 01 304034, CN 1337439, JP 2006 274233, KR 2004033376, JP 2006 083238, JP 2006 070231, WO 03/002700, FR 2740779, DE 2939519, U.S. Pat. No. 7,558,654, FR 2855752, EP 1445302, JP 2008 062179 and JP 2007 181789 or the documents cited therein. Suitable biosurfactants can be acquired e.g. from Soliance, France.

Preferably, the composition according to the present invention comprises, as compound D), at least one biosurfactant selected from rhamnolipids, preferably mono-, di- or polyrhamnolipids, glucolipids, preferably mono-, di- or polyglucolipids, and sophorolipids, preferably mono-, di- or polysophorolipids. Most preferred biosurfactants D) are sophorolipids.

The term "rhamnolipids" in the context of the present invention preferably is understood to mean particularly compounds of the general Formula (I), and salts thereof:

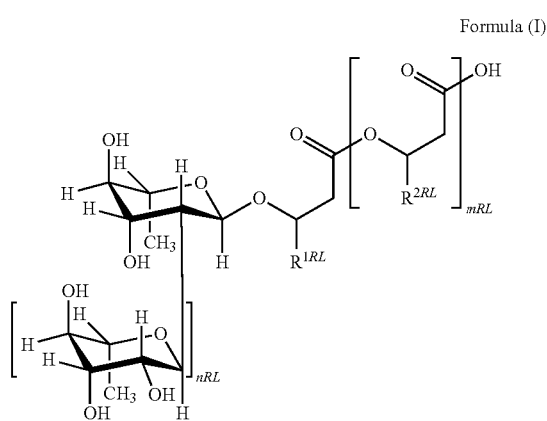

Formula (I)

wherein
mRL=2, 1 or 0,
nRL=1 or 0,
$R^{1RL}$ and $R^{2RL}$=mutually independently, identical or different, organic residues having 2 to 24, preferably 5 to 13 carbon atoms, in particular optionally branched, optionally substituted, particularly hydroxy-substituted, optionally unsaturated, in particular optionally mono-, bi- or tri-unsaturated alkyl residues, preferably those selected from the group consisting of pentenyl, heptenyl, nonenyl, undecenyl and tridecenyl and $(CH_2)_o$—$CH_3$ wherein o=1 to 23, preferably 4 to 12.

If nRL=1, the glycosidic bond between the two rhamnose units is preferably in the α-configuration. The optically active carbon atoms of the fatty acids are preferably present as R-enantiomers (e.g. (R)-3-{(R)-3-[2-O-(α-L-rhamnopyranosyl)-α-L-rhamnopyranosyl]oxydecanoyl}oxydecanoate).

The term "mono-rhamnolipid" in the context of the present invention is understood to mean compounds of the general formula (I) or salts thereof, where nRL=0. The term "di-rhamnolipid" in the context of the present invention is understood to mean compounds of the general formula (I) or salts thereof, where nRL=1.

Distinct rhamnolipids are abbreviated according to the following nomenclature:

"diRL-CXCY" are understood to mean di-rhamnolipids of the general formula (I), in which one of the residues $R^{1RL}$ and $R^{2RL}$=$(CH_2)_o$—$CH_3$ where o=X-4 and the remaining residue $R^1$ or $R^2$=$(CH_2)_o$—$CH_3$ where o=Y-4.

"monoRL-CXCY" are understood to mean mono-rhamnolipids of the general formula (I), in which one of the residues $R^{1RL}$ and $R^{2RL}$=$(CH_2)_o$—$CH_3$ where o=X-4 and the remaining residue $R^{1RL}$ or $R^{2RL}$=$(CH_2)_o$—$CH_3$ where o=Y-4.

The nomenclature used therefore does not distinguish between "CXCY" and "CYCX".

For rhamnolipids where mRL=0, monoRL-CX or diRL-CX is used accordingly.

If one of the abovementioned indices X and/or Y is provided with ":Z", this signifies that the respective residue $R^{1RL}$ and/or $R^{2RL}$ is equal to an unbranched, unsubstituted hydrocarbon residue having X-3 or Y-3 carbon atoms having Z double bonds.

Methods for preparing the relevant rhamnolipids are disclosed, for example, in EP2786743 and EP2787065.

Rhamnolipids applicable in the context of the present invention can also be produced by fermentation of *Pseudomonas*, especially *Pseudomonas aeruginosa*, which are preferably non genetically modified cells, a technology already disclosed in the eighties, as documented e.g. In EP0282942 and DE4127908. Rhamnolipids produced in *Pseudomonas aeruginosa* cells which have been improved for higher rhamnolipid titres by genetical modification can also be used in the context of the instant invention; such cells have for example been disclosed by Lei et al. in Biotechnol Lett. 2020 June; 42(6):997-1002.

In the context of the present invention, the term "sophorolipids" preferably is understood as meaning compounds of the general Formulae (IIa) and (IIb), and salts thereof:

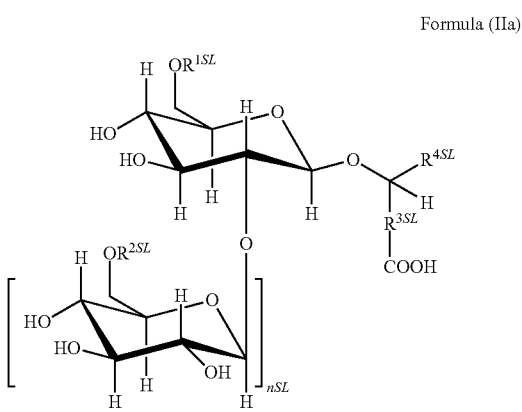

Formula (IIa)

-continued

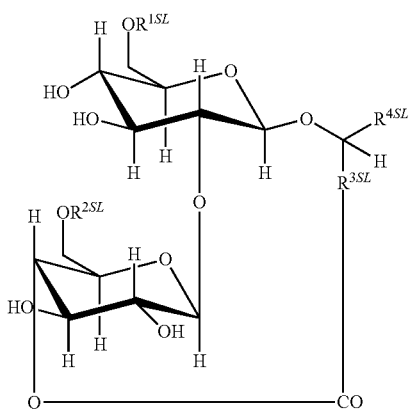

Formula (IIb)

wherein
$R^{1SL}$=H or CO—CH$_3$,
$R^{2SL}$=H or CO—CH$_3$,
$R^{3SL}$=a divalent organic moiety which comprises 6 to 32 carbon atoms and which is unsubstituted or substituted by hydroxyl functions, is unbranched and optionally comprises one to three double or triple bonds,
$R^{4SL}$=H, CH$_3$ or a monovalent organic radical which comprises 2 to 10 carbon atoms and which is unsubstituted or substituted by hydroxyl functions, which is unbranched and which optionally comprises one to three double or triple bonds, and
nSL=1 or 0.

Sophorolipids may be used in accordance with the invention in their acid form or their lactone form.

Preferred compositions according to the present invention comprise a sophorolipid, in which the ratio by weight of lactone form to acid form is in the range of 20:80 to 80:20, especially preferably in the ranges of 30:70 to 40:60.

To determine the content of sophorolipids in the acid or lactone form in a formulation, refer to EP1411111B1, page 8, paragraph [0053].

In connection with the present invention, the term "glucolipids" preferably is understood as meaning compounds of the general formula (III) and salts thereof,

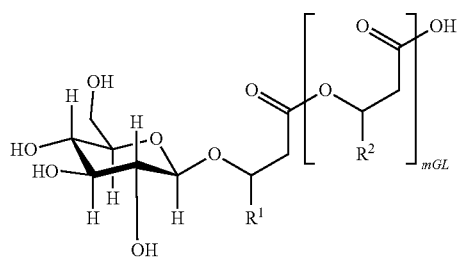

Formula (III)

wherein
mGL=1 or 0,
$R^{1GL}$ and $R^{2GL}$=independently of one another identical or different organic radical having 2 to 24 carbon atoms, in particular optionally branched, optionally substituted, in particular hydroxy-substituted, optionally unsaturated, in particular optionally mono-, di- or tri-unsaturated, alkyl radical, preferably one selected from the group consisting of pentenyl, heptenyl, nonenyl, undecenyl and tridecenyl and (CH$_2$)$_o$—CH$_3$ where o=1 to 23, preferably 4 to 12.

Distinct glucolipids are abbreviated according to the following nomenclature:
"GL-CXCY" is understood as meaning glucolipids of the general formula (III) in which one of the radicals $R^{1GL}$ and $R^{2GL}$=(CH$_2$)$_o$—CH$_3$ where o=X-4 and the remaining radical $R^{1GL}$ or $R^{2GL}$=(CH$_2$)$_o$—CH$_3$ where o=Y-4.

The nomenclature used thus does not differentiate between "CXCY" and "CYCX".

If one of the aforementioned indices X and/or Y is provided with ":Z", then this means that the respective radical $R^{1GL}$ and/or $R^{2GL}$=an unbranched, unsubstituted hydrocarbon radical with X-3 or Y-3 carbon atoms having Z double bonds.

Methods for production of glucolipids can be carried out as described in WO2019154970.

Preferably, the amounts of the carrier medium, compounds A), B) and C) in the wax dispersant composition, and optionally other additives, preferably compounds D), sum up to at least 90% by weight, more preferably from 90 to 100% by weight, even more preferably sum up to from 95 to 100% by weight, most preferably sum up to 100% by weight, based on the total weight of the wax dispersant composition.

Process for Preparing the Wax Dispersant Composition of the Invention

Another aspect of the present invention Is a process for preparing a wax dispersant composition according to the invention, which comprises mixing a carrier medium and compounds A), B) and C), and optionally further compounds, such as compound D), to provide the wax dispersant composition as defined above.

In a preferred embodiment, the compounds of the wax dispersant composition are mixed at room temperature (range of 18 to 25° C.), preferably for at least 30 minutes to allow efficient mixing of the compounds.

Use of the Wax Dispersant Composition According to the Invention

A further aspect of the invention is the use of the wax dispersant composition according to the present invention for treating waxy crude oils and condensates to enhance oil recovery. In the context of the present invention, the wax dispersant composition is an additive composition which is added to the treatment fluid.

In particular, the present invention relates to a method for treating a crude oil with a wax dispersant composition according to the present invention to enhance oil recovery by reducing interfacial tension between the crude oil and the treatment fluid.

In the context of the invention, the term "treatment fluid" refers to the carrier medium in field applications. Preferably, the treat rate of wax dispersant composition (additive composition) In the treatment fluid is from 0.01% to 1% by weight, based on the total weight of the treatment fluid injected for the recovery of oil and gas from crude oil and gas wells.

In the context of the present invention, the term "crude oil" or "waxy crude oils and condensates" is equally defined as the crude oil that contains high amount of long chain paraffin wax (alkanes) compounds, making the crude possess a high pour point and become viscous at lower temperatures than wax appearance temperatures.

Experimental Part

The invention is further illustrated in detail hereinafter with reference to examples and comparative examples, without any intention to limit the scope of the present invention.

Abbreviations
 Crude oil (i) see Table 1 for the crude oil composition
 EA ethoxylated alcohol or amine
 REWOFERM SL P sophorolipid with a lactone:acid ratio of 60:40, 50% active in water
 SPL sophorolipid
 TEA-DDBSA triethanolamine salt of dodecylbenzene sulfonic acid
 POLYCARE133 Poly(Methacrylamidopropyltrimethylammonium) Chloride, 34% in water from Solvay
 MAPTAC 3-trimethylammoniumpropyl methacrylamide chloride Ethoxylated Alcohol 1 Is an ethoxylated alcohol product from Evonik, TOMADOL® 91-6, containing an average of 6 ethylene oxide groups with an HLB value of 12.4.

MAPTAC is 3-trimethylammoniumpropyl methacrylamide chloride. VISIOMER® MAPTAC from Evonik was used in the examples and is provided 50% in water.

Sophorolipid-based biosurfactant 1 is REWOFERM SL One produced by Evonik, 50% in water, and Sophorolipid-based biosurfactant 2 is REWOFERM SL P produced by Evonik, 50% in water.

TEA-DDBSA is triethanolamine salt of linear alkylbenzene sulfonic acid. The product BIO-SOFT® N-300 from Stepan Company was used in the examples and corresponds to a is a 60% active aqueous solution of triethanolamine Dodecylbenzene Sulfonate (TEA-DDBSA).

Methods

Emulsion Break Test According to the Invention

The emulsion break test was carried out by adding 10 mL of crude oil to a 25 mL graduated tube at ambient temperature. 10 mL of tap water and the chemical treatment was added to the same graduated cylinder. The graduated tube was vortexed for one minute. After mixing, the mL of oil and water layers were recorded every minute for the first 10 minutes, then once at 15, 20, 25, and 30 minutes. The "min to break" value represents the time at which the layers were separated and no further change in layer volume was recorded. This simple procedure permits easy testing of products to determine their effectiveness in breaking oil/water emulsions usually occurring with the contact of brine and crude oil under intense flow. Thus, the shorter the "min to break" value, the better the performance of the corresponding wax dispersant composition in crude oil recovery.

Pour point of the dispersions was measured according to ASTM D5853.

Wax Appearance Temperature (WAT), Wax Disappearance Temperature (WDT), and wax content of the crude oils were determined by differential scanning calorimetry.

The percentages by weight of saturates, aromatics, resins, and asphaltenes (SARA analysis) in the crude oils were determined using Iatroscan TLC-FID using the IP-469 standard method.

The percentages by weight of saturates, aromatics, resins, and asphaltenes (SARA analysis) in the crude oils were determined using Iatroscan TLC-FID using the IP-469 standard method.

Crude Oil Properties

TABLE 1

Characteristics of the crude oil (i) used in the performance test of the wax dispersants

|  |  | Crude oil (i) |
|---|---|---|
| Wax content | [wt %] | 2.8 |
| Pour Point | [° C.] | −33 |
| Wax Appearance Temperature | [° C.] | 22.4 |
| Wax Disappearance Temperature | [° C.] | 33 |
| Saturates | [wt %] | 54 |
| Aromatics | [wt %] | 30 |
| Resins | [wt %] | 15.4 |
| Asphaltenes | [wt %] | 0.8 |

Preparation of Comparative Example 1

Comparative Example CE1 was prepared by adding 24 g of BIOSOFT N-300, 6 g TOMADOL 91-6 and 70 g of water into a 200 mL beaker. The components were blended using an overhead stirrer for 30 min at room temperature. Crude oil (i) was treated with 1000 ppm of CE1 by adding 0.1 g of CE1 to 99.9 g of Crude oil (i) and blending at room temperature for 60 minutes.

All inventive examples and comparative examples were prepared following the same preparation process as for Comparative Example CE1, according to weight ratios as reflected in Table 2 below. Their corresponding performance with a waxy crude oil (i) is also given in Table 2.

TABLE 2

Performance of wax dispersant composition in crude oil (i)

| Compound |  | Crude oil (i) | CE 1 | CE2 | CE3 | CE4 | CE5 | CE6 | Ex 1 | Ex 2 |
|---|---|---|---|---|---|---|---|---|---|---|
| BIOSOFT N-300, 60% active in water (compound A) | [wt %]* |  | 14.4 | 6.3 | 3 | 9 | 11.4 | 13.2 | 12 | 10.8 |
| TOMADOL 91-6 (compound B) | [wt %] |  | 6 | 3 | 2 | 4.5 | 5 | 7 | 6 | 6 |
| VISIOMER MAPTAC, 50% in water (compound C) | [wt %]* |  |  | 8.25 | 2.5 | 5.25 | 3 | 0.5 | 2 | 1 |
| REWOFERM SL P, 50% in water (compound D) | [wt %]* |  |  |  |  | 5 |  |  |  | 2 |
| Water | [wt %] |  | 79.6 | 82.45 | 87.5 | 81.25 | 80.6 | 79.3 | 80 | 80.2 |
| Total amount of A), B), C) of all components, not including carrier medium | [wt %] |  | — | 100 | 60 | 100 | 100 | 100 | 100 | 89.9 |
| Ratio A) + B) to C) (xx:1) | [xx:1] |  | — | 1.1 | 2.0 | 2.6 | 5.5 | 40.4 | 9 | 16.8 |
| Emulsion break @ RT, 1000 ppm in Crude oil (i) | [min to break] | >30 | 15 | 20 | 20 | 20 | 25 | 15 | 9 | 9 |

*wt % of active component only. The percentages do not include the water carrier medium that is part of the wax dispersant composition
(—) no compound C Result Discussion The untreated crude oil (i) had an emulsion result of more than 30 min as measured according to the above-indicated emulsion test.

Comparative Example CE1, inventive Example 1 and inventive Example 2 all use TEA-DDBSA and alcohol ethoxylates. The inventive examples show the effect of the addition of MAPTAC on the emulsion break test. In CE1, the emulsion did not break until 15 minutes. In contrast, Inventive examples 1 and 2 have an emulsion break result of 9 minutes.

Comparative Examples CE 2-6 demonstrate the importance of the ratio of compounds A) and B) to D) as defined in the description. All of these comparative examples contain the necessary components, but the ratio of components is not in the inventive ratio range as defined in the description. The emulsion break results for these samples are all 15 minutes or greater, showing poor performance relative to the inventive examples with emulsion break results of 9 minutes.

The experimental results show that the wax dispersant compositions of the present invention have improved oil recovery performance due to faster separation of the oil-water emulsions. The wax dispersant compositions of the present invention, combining some compounds at a certain weight ratio, allow to decrease the time before oil and water are separated. Thus, using the wax dispersant compositions in oil drilling boosts oil recovery by significantly lowering the interfacial tension between water and oil, thus increasing oil mobility by allowing better displacement of the oil by injected treatment fluids.

The invention claimed is:

1. A wax dispersant composition for subterranean applications, comprising:
   a carrier medium, and
   the following compounds:
   A) a nonionic alcohol ethoxylate,
   B) an alkylbenzene sulfonate, and
   C) a bifunctional quaternary ammonium chloride salt of Formula (IV)

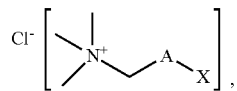

Formula (IV)

wherein A is a branched or unbranched $C_1$ to $C_4$ alkyl residue,
X is OY or NHY, and
Y is H, $C_1$-$C_3$ alkyl residue, $C(=O)C(CH_3)=CH_2$, $C(=O)CH=CH_2$, $C(=O)CH(CH_3)CH_3$, or $C(=O)CH_2CH_3$,
wherein a weight ratio of a total amount of compound A) and compound B) to an amount of compound C) is from 7:1 to 25:1.

2. The wax dispersant composition according to claim 1, wherein the weight ratio of compound A) and compound B) to compound C) In the wax dispersant composition is from 7:1 to 20:1.

3. The wax dispersant composition according to claim 1, wherein the compound A) is an alcohol ethoxylate with the Formula $R(OC_2H_4)_nOH$,
wherein R is a branched or linear aliphatic hydrocarbyl radical containing from 6 to 16 carbon atoms, and wherein n ranges from 2 to 14.

4. The wax dispersant composition according to claim 3, wherein the compound A) has an average of 1 to 10 ethylene oxide groups with an HLB value of from 5 to 15.

5. The wax dispersant composition according to claim 1, wherein the compound B) is triethanolamine salt of dodecylbenzene sulfonic acid.

6. The wax dispersant composition according to claim 1, wherein in Formula (IV) of compound C), A is an unbranched $C_1$ to $C_4$ alkyl residue.

7. The wax dispersant composition according to claim 1, wherein in Formula (IV) of compound C), X is selected from the group consisting of OY with Y being hydrogen or $C(=O)C(CH_3)=CH_2$, and NHY with Y being $C(=O)C(CH_3)=CH_2$.

8. The wax dispersant composition according to claim 1, wherein the compound C) of Formula (IV) is 3-trimethylammoniumpropyl methacrylamide chloride, trimethylaminoethyl methacrylate chloride, or a mixture thereof.

9. The wax dispersant composition according to claim 1, wherein a total amount of compound A), compound B), and compound C) is from 10 to 100% by weight, based on a total weight of all compounds in the wax dispersant composition, not including the carrier medium.

10. The wax dispersant composition according to claim 1, wherein the composition further comprises a biosurfactant D), which is selected from the group consisting of rhamnolipids, sophorolipids, glucolipids, and a mixture thereof.

11. The wax dispersant composition according to claim 10, wherein the biosurfactant D) is a sophorolipid, in which a ratio by weight of a lactone form to an acid form is in the range of 20:80 to 80:20.

12. The wax dispersant composition according to claim 1, wherein a total content of the carrier medium in the composition is from 10 to 90% by weight, based on the total weight of the wax dispersant composition.

13. The wax dispersant composition according to claim 1, wherein an amount of the carrier medium, compound A), compound B), and compound C) in the wax dispersant composition, sums up to at least 90% by weight, based on a total weight of the wax dispersant composition.

14. A method for preparing the wax dispersant composition as defined in claim 1, the method comprising:
   mixing the carrier medium, the compound A), the compound B), and the compound C), to provide the wax dispersant composition.

15. A method for reducing interfacial tension between crude oil and a treatment fluid in the recovery of oil and gas from crude oil and gas wells, the method comprising:
   adding the wax dispersant composition according to claim 1 to the crude oil.

16. The wax dispersant composition according to claim 3, wherein R is a branched or linear aliphatic hydrocarbyl radical containing from 8 to 14 carbon atoms.

17. The wax dispersant composition according to claim 6, wherein in Formula (IV) of compound C), A is an unbranched $C_1$ to $C_2$ alkyl residue.

18. The wax dispersant composition according to claim 9, wherein the total amount of compound A), compound B), and compound C) is from 50 to 100% by weight, based on the total weight of all compounds in the wax dispersant composition, not including the carrier medium.

19. The wax dispersant composition according to claim 11, wherein the ratio by weight of the lactone form to the acid form is in the range of 30:70 to 40:60.

20. The wax dispersant composition according to claim 12, wherein the total content of the carrier medium in the composition is from 30 to 90% by weight.

\* \* \* \* \*